United States Patent [19]
Yoshino

[11] Patent Number: 5,414,628
[45] Date of Patent: May 9, 1995

[54] ESTIMATED VEHICLE SPEED CALCULATION APPARATUS

[75] Inventor: Masato Yoshino, Osaka, Japan

[73] Assignee: Sumitomo Electric Industries, Ltd., Osaka, Japan

[21] Appl. No.: 909,653

[22] Filed: Jul. 7, 1992

[30] Foreign Application Priority Data

Jul. 11, 1991 [JP] Japan .................................. 3-171059

[51] Int. Cl.⁶ ............................................... B60T 8/60
[52] U.S. Cl. .................................. 364/426.02; 303/95; 303/100
[58] Field of Search ....................... 364/426.01, 426.02, 364/426.03, 565; 303/95, 111, 96, 100; 180/197

[56] References Cited

U.S. PATENT DOCUMENTS

| | | | |
|---|---|---|---|
| 4,134,621 | 1/1979 | Smedley et al. | 303/96 |
| 4,859,002 | 8/1989 | Yoshino | 303/103 |
| 4,877,295 | 10/1989 | Yoshino | 303/109 |
| 4,980,831 | 12/1990 | Katayama et al. | 364/426.02 |
| 5,019,984 | 5/1991 | Masaki et al. | 364/426.02 |
| 5,109,694 | 5/1992 | Yahagi et al. | 73/9 |
| 5,219,693 | 5/1993 | Kuwana et al. | 364/426.02 |
| 5,240,313 | 8/1993 | Yoshino et al. | 303/111 |

FOREIGN PATENT DOCUMENTS

| | | |
|---|---|---|
| 0299510 | 1/1989 | European Pat. Off. . |
| 0322911 | 7/1989 | European Pat. Off. . |
| 3923782 | 1/1990 | Germany . |
| 3917976 | 12/1990 | Germany . |
| 53-134186 | 11/1978 | Japan . |
| 2303963 | 12/1990 | Japan . |
| 1592932 | 2/1977 | United Kingdom . |
| 1600050 | 10/1981 | United Kingdom . |

Primary Examiner—Kevin J. Teska
Assistant Examiner—Susan Wieland
Attorney, Agent, or Firm—Sandler Greenblum & Bernstein

[57] ABSTRACT

An apparatus for calculating an estimated vehicle speed. The estimated vehicle speed is based upon the wheel speed of a wheel associated with a brake of the vehicle that has been applied, in order to obtain an estimated vehicle speed that closely approximates the true vehicle speed. The present invention is especially applicable to vehicles having an antilock control system, in that the antilock brake control can be more accurately controlled to be operated when the wheel speed of the vehicle exceeds a predetermined amount less than the true vehicle speed.

19 Claims, 13 Drawing Sheets

ESTIMATED VEHICLE SPEED CALCULATION APPARATUS

BACKGROUND OF THE INVENTION

1. Field of the Invention

The present invention relates to an antilock brake control device for a vehicle having both driven and non-driven wheels, and more particularly to the estimated vehicle speed calculation apparatus of said vehicle.

2. Prior Art

When the brakes are applied to a moving vehicle, the rotational velocity of the wheels decreases, causing the speed of the vehicle itself to also decrease.

However, when the brake force causes such a rapid deceleration of the wheels that the coefficient of friction of the road surface is exceeded, as can happen when the brakes are applied hard and suddenly in an emergency, the wheels tend to lock and the tires slip on the road surface, greatly increasing the danger of the situation. Antilock brake control systems are intended to prevent and release this wheel locking state.

Typically, an antilock brake control device compares the wheel speed with the vehicle speed and begins applying antilock brake control based on various conditions to automatically relax the brake force. One of the conditions used to determine when to start antilock brake control is when the wheel speed is more than a predetermined amount less than the vehicle speed.

However, while an estimated vehicle speed calculated according to the wheel speed is generally used as the vehicle speed, if the estimated vehicle speed is calculated based on the speed of the wheel to which the brakes are applied or antilock brake control is applied, the difference between the calculated estimated vehicle speed and the actual vehicle speed will be great, and accurate antilock brake control will be difficult to achieve.

SUMMARY OF THE INVENTION

Therefore, an object of the present invention is to provide an estimated vehicle speed calculation apparatus for a vehicle having both driven and non-driven wheels that is characterized by being able to calculate an estimated vehicle speed that is closer to the actual vehicle speed when the brakes are applied or antilock brake control is applied to any of the wheels.

To achieve this object, an estimated vehicle speed calculation apparatus according to the present invention comprises a means of storing, the estimated vehicle speed at the time antilock brake control of any driven or non-driven wheel begins, or at the time when brake operation begins, and a means for calculating the estimated vehicle speed by comparing the driven and non-driven wheel speeds and selecting the highest wheel speed where the driven wheel speed is also lower than the estimated vehicle speed stored in the storage means, and calculating the estimated vehicle speed based on the selected highest wheel speed during the period antilock brake control is applied to any driven or non-driven wheel or the brakes are applied.

When antilock brake control of any driven or non-driven wheel begins, the estimated vehicle speed at that time is stored in the storage means. If the brakes are then applied, this first stored estimated vehicle speed is overwritten by the estimated vehicle speed at the time the brakes are applied.

The estimated vehicle speed calculation means according to the present invention can calculate an estimated vehicle speed that is closer to the actual vehicle speed without obtaining a high false estimated vehicle speed due to wheel spinning because the estimated vehicle speed is calculated based on the highest wheel speed selected from among the non-driven wheel speeds and the highest driven wheel speed that is also not greater than the stored estimated vehicle speed.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
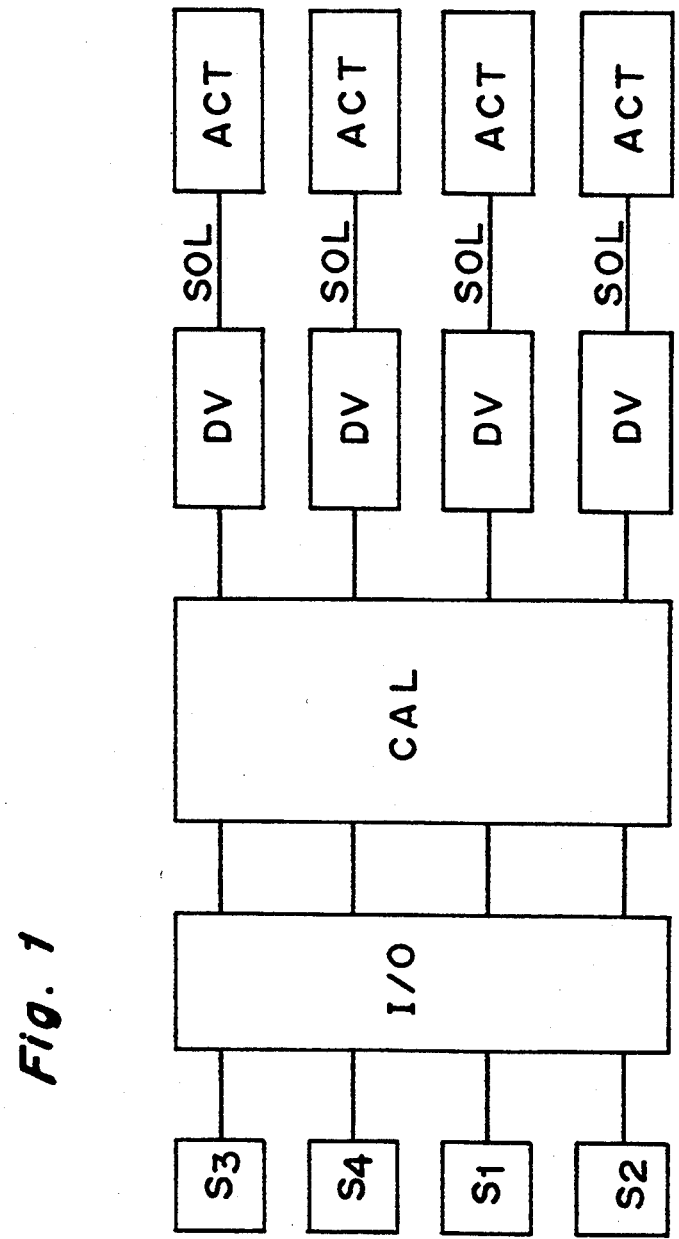
FIG. 1 is a block diagram of an antilock brake control system comprising an estimated vehicle speed calculation apparatus for a vehicle according to the present invention.

The preferred embodiments of the present invention are described below with reference to the accompanying figures, of which FIG. 1 is a block diagram of an antilock brake control device provided with an estimated vehicle speed calculation apparatus according to the present invention. Note that while the preferred embodiments of the invention are described hereinbelow with reference to a four wheel, rear wheel drive vehicle, the invention can also be applied to a four wheel, front wheel drive, as well as to four wheel drive vehicles equipped with viscous couplings. In a four wheel drive vehicle equipped with viscous couplings the drive wheels connected to the engine via the viscous couplings are treated as the non-driven wheels or as the driven wheels according to the coupling characteristics.

Referring to FIG. 1, this antilock brake control device comprises a separate wheel speed sensor for each of the wheels, S3 and S4 for the non-driven wheels and S1 and S2 for the driven wheels, and a brake switch BS, which is not shown in the figures. The input interface I/O outputs a signal dependent upon the rotational velocity of the driven and non-driven wheels, and another signal based on the on/off state of the brake switch BS. The input interface I/O outputs are used by the calculation unit CAL to calculate the estimated vehicle speed and to perform the calculations required for antilock brake control of each of the four wheels. The results of the antilock brake control calculations are input to the drive circuits DV, each of which then generates a solenoid output SOL to drive a corresponding actuator ACT, each of which has a solenoid. As shown in FIG. 1, a drive circuit DV and actuator ACT is provided for each of the four wheels. The actuator ACT causes the hydraulic pressure of the corresponding brake to drop, thus enabling separate antilock brake control of each wheel.

Figure 2:
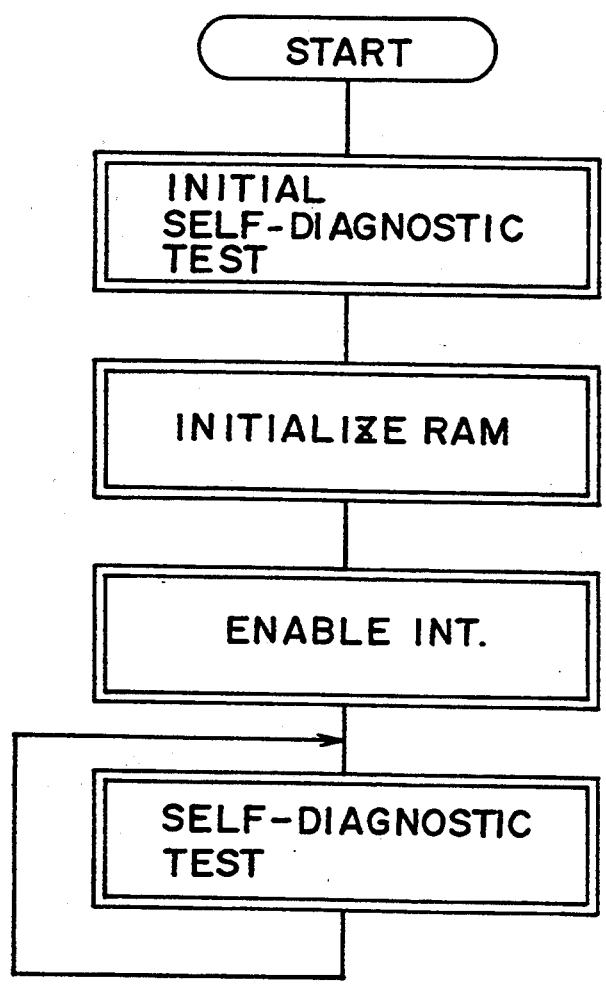
FIG. 2 is a flow chart of the control steps executed by the calculation unit of the antilock brake control system comprising an estimated vehicle speed calculation apparatus according to the present invention.
Figure 3:
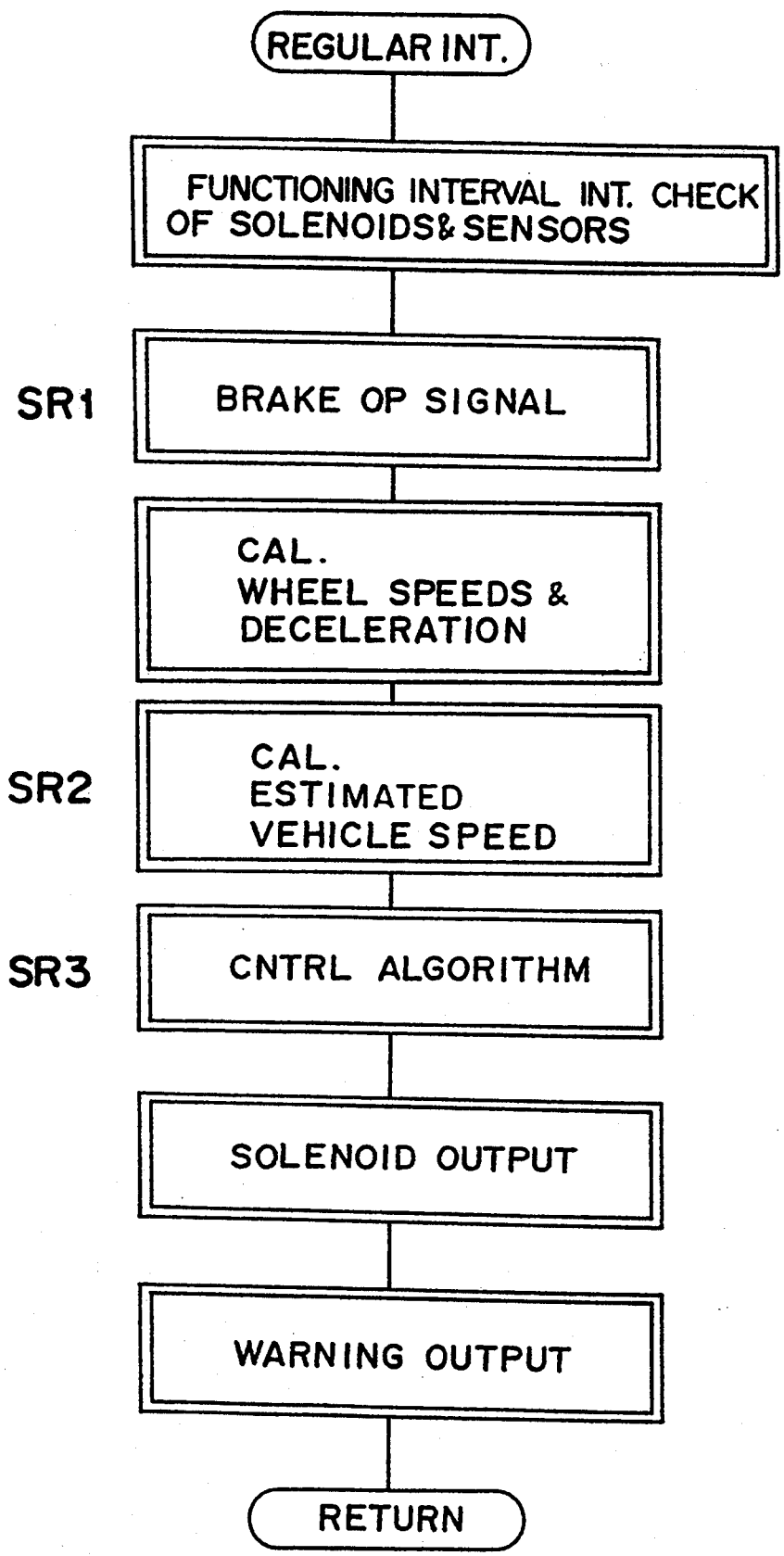
FIG. 3 is a flow chart of the interrupt routine performed intervally in the calculation unit of the antilock brake control system comprising an estimated vehicle speed calculation apparatus according to the present invention.
Figure 4:
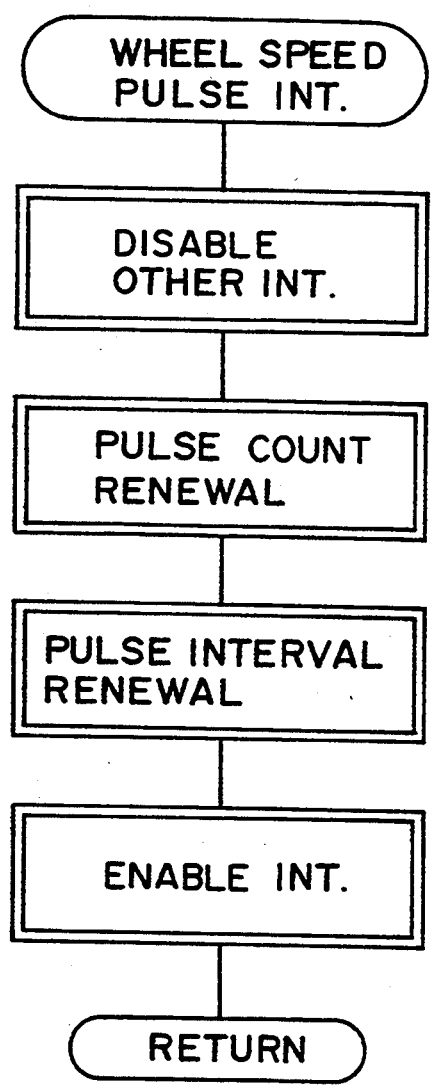
FIG. 4 is a flow chart of the wheel speed pulse interrupt routine performed in the calculation unit of the antilock brake control system comprising an estimated vehicle speed calculation apparatus according to the present invention, FIG. 5 ms a detailed flow chart of the brake operation signal polling subroutine SR1 shown in FIG. 3.

FIGS. 2-4 are flow charts of the control steps executed by the calculation unit CAL. FIG. 2 shows the basic control routine, the first step after control starts being a self-diagnostic test of the system. The RAM is then initialized, and control procedure interruption is then enabled. The procedure then enters a self-diagnostic system test loop.

FIG. 3 shows the interrupt routine performed at each scheduled interval during the self-diagnostic system test loop at the end of the basic control routine shown in FIG. 2. This interval interrupt routine consists of several subroutines, the first being a functioning test of the solenoids, sensors, and other components. The brake operation signal is then obtained in the next subroutine SR1. A subroutine for calculating the wheel speeds and deceleration is then executed, after which the estimated vehicle speed is calculated (subroutine SR2). The control algorithm subroutine (SR3) is then executed to determine whether antilock brake control has been initiated or is being applied. The subroutines for solenoid and warning lamp output determinations are then executed to complete one regular interrupt routine. This same routine is later repeated after a predetermined wait period.

FIG. 4 is the flow chart of the wheel speed pulse interrupt routine used to read the pulse corresponding to the rotational velocity of each wheel. This wheel speed pulse interrupt routine includes subroutines for an interrupt disabling, pulse count renewal, and pulse interval renewal. When the wheel speed pulse interrupt routine starts, other interruptions are prohibited. Thus the interval interrupt routine will not be started even when the time comes. The wheel speed pulse count and pulse interval are then renewed, and the interrupt flag is again set to enable execution of the interval interrupt routine.

Figure 5:
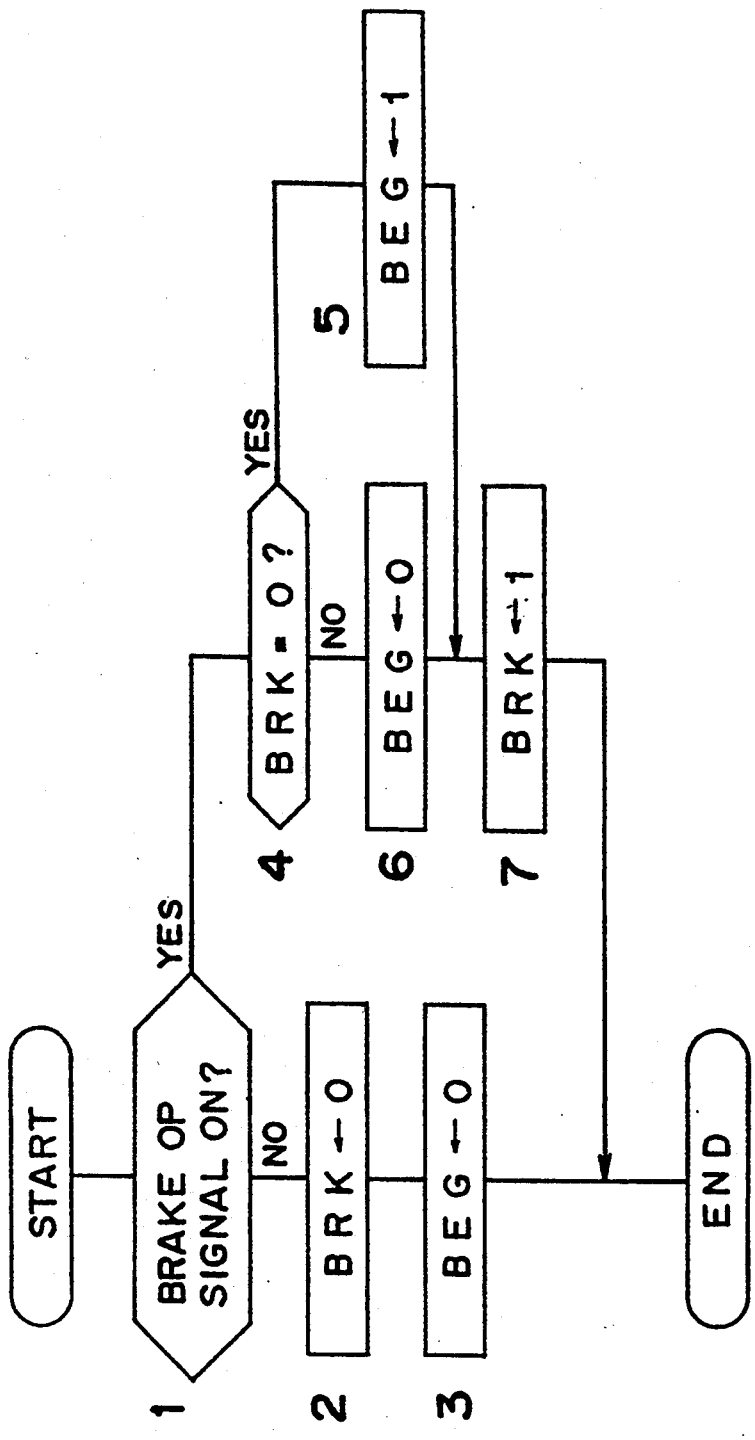

FIG. 5 is the flow chart of the detailed steps of the brake operation signal obtaining subroutine S1 shown in FIG. 3. It is determined at step #1 whether the brake operation signal is ON. If the brake operation signal is ON, it indicate that the brake switch BS is now being operated. If a NO is returned, i.e., the brakes are not applied, the procedure advances to step #2 to reset the brake flag BRK to 0, and to step #3 to reset the brake edge flag BEG to 0. Note that the brake flag BRK is set to 1 while the brakes are applied, and that the brake edge flag BEG is set to 1 in a pulse form at the very beginning of application of the brake, and is set to 0 at all other times.

If the result of step #1 is YES, indicating that the brakes are applied, the procedure advances to step #4 to detect whether or not the brake flag BRK is reset. If the brake flag is reset (BRK=0) at step #4, the procedure advances to step #5 to set the brake edge flag BEG to 1. If BRK=1 at step #4, the procedure advances to step #6 to reset the brake edge flag BEG to 0. From both steps #5 and #6 the procedure advances to step #7 to set the brake flag BRK to 1.

Figure 6:
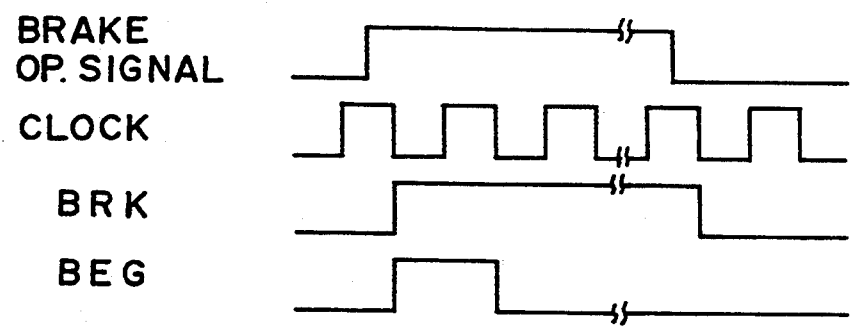
FIG. 6 is a control timing chart used in the calculation unit of the antilock brake control system comprising an estimated vehicle speed calculation apparatus according to the present invention.

The operation controlled by the flow chart in FIG. 5 is described in more detail below with reference to the timing chart of the various signals in FIG. 6.

When the brakes are not applied, steps #1, #2, and #3 are executed to reset both the brake flag BRK and brake edge flag BEG to 0. During the first cycle through the subroutine after the brakes are operated (corresponding to the first clock signal drop edge in FIG. 6), the procedure advances from step #1 to step #4. Because the brake flag BRK is reset to BRK=0 at this time, the procedure advances to step #5 to set the brake edge flag BEG to 1, and then to step #7 to set the brake flag BRK to 1.

If the brakes are still being applied during the next cycle, the procedure again advances from step #1 to step #4, and then to step #6 because the brake flag BRK is set (BRK=1). The brake edge flag BEG is reset (BEG=0) at step #6, and the brake flag BRK is refreshed to remain BRK=1 at step #7.

The subroutine continues to loop through steps #1, #4, #6, and #7 as long as the brakes are applied.

Once the brakes are released, subroutine step #1 returns a NO, both the brake flag BRK is reset to 0 (step #2), and the brake edge flag BEG is refreshed to remain BEG=0 (step #3).

The brake flag BRK is therefore set when the brakes are operated and remains set for as long as the brakes are applied, but the brake edge flag BEG is set (BEG=1) when the brakes are first applied and reset (BEG=0) in the next loop through the subroutine while the brakes remain applied.

Figure 7:
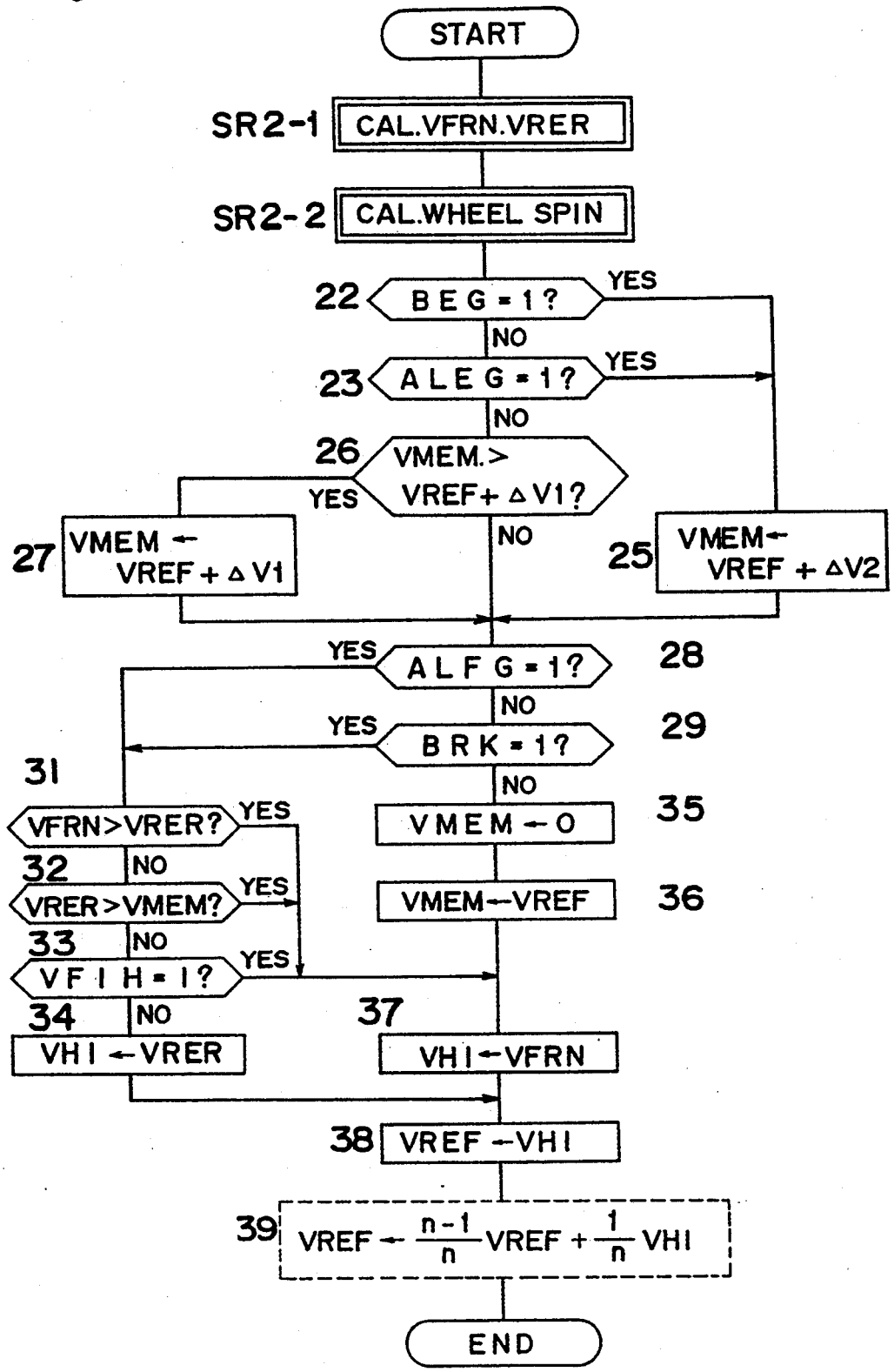
FIG. 7 is a detailed flow chart of the subroutine used to calculate the estimated vehicle speed in the calculation unit of the antilock brake control system comprising an estimated vehicle speed calculation apparatus according to the present invention.
Figure 8:
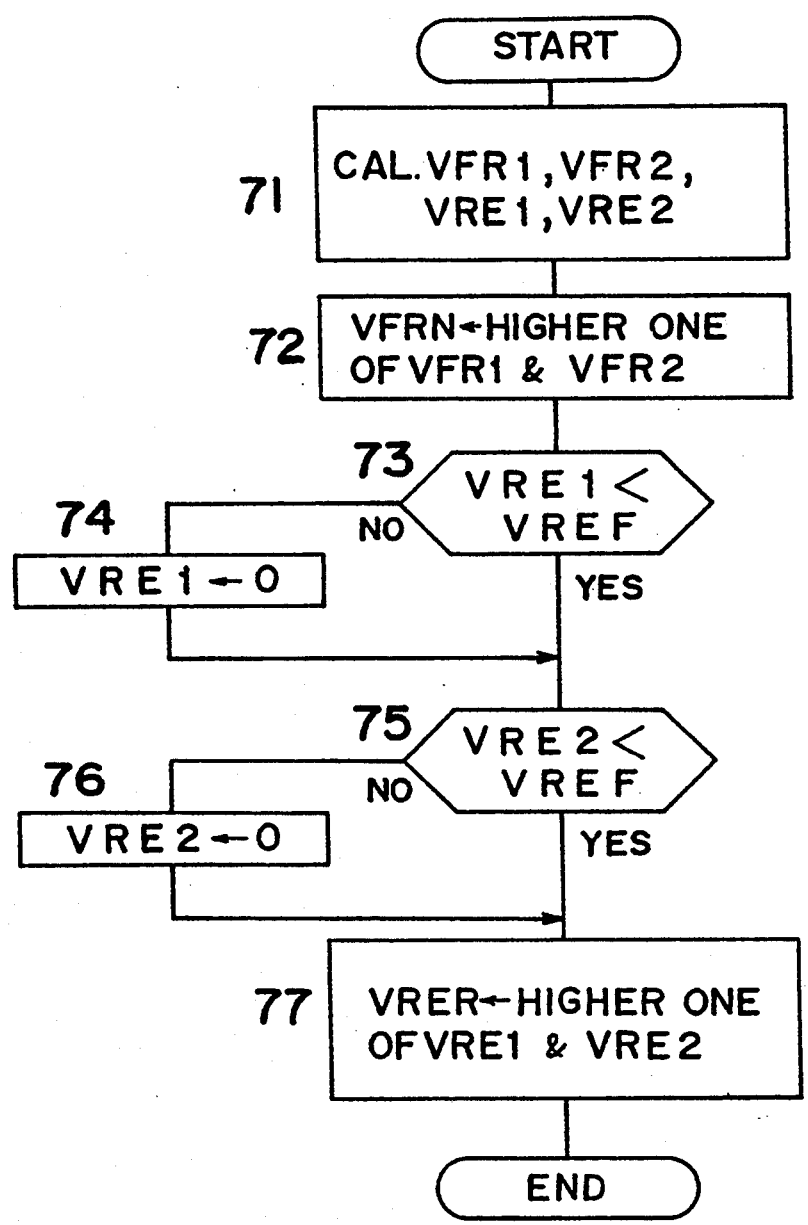
FIG. 8 is detailed flow chart of the subroutine used for non-driven and driven wheel speed detection in the calculation unit of the antilock brake control system comprising an estimated vehicle speed calculation apparatus according to the present invention.

FIG. 7 is a detailed flow chart of the subroutine S2 used to calculate the estimated vehicle speed. This main subroutine also includes two auxiliary subroutines executed at the beginning of the procedure. In the first subroutine S2-1 the non-driven wheel speed VFRN and the driven wheel speed VRER are calculated. It is important to note that a single non-driven wheel speed VFRN is calculated from the wheel speeds VFR1 and VFR2 of the two non-driven wheels, and a single driven wheel speed VRER is calculated from the wheel speeds VRE1 and VRE2 of the two driven wheels. The subroutine S2-1 for VFRN and VRER calculation is shown in FIG. 8.

The first step (#71) of this subroutine is to calculate the wheel speed of each wheel (VFR1, VFR2, VRE1 and VRE2). The two non-driven wheel speeds VFR1 and VFR2 are then compared, and the higher value is set as the non-driven wheel speed VFRN. From step #73 to step #77 the driven wheel speeds VRE1 and VRE2 are each compared with the previous estimated vehicle speed VREF, and the single driven wheel speed VRER is set to be the higher one of the two driven wheel speeds VRE1 and VRE2, but that is also less than the estimated vehicle speed VREF. It is to be noted here that, at steps #74 and #76, when either value VRE1 or VRE2 becomes greater than the previous estimated vehicle speed VREF, it is reset to 0 before the final assignment of the driven wheel speed VRER.

After the subroutine SR2-1 for detecting the non-driven wheel speed VFRN and driven wheel speed VRER is completed, it returns to the main estimated vehicle speed calculation procedure, from which the wheel spin calculation subroutine SR2-2 is executed. This subroutine determines whether the driven wheel speed VRER can be used in the estimated vehicle speed calculation based on whether or not the driven wheels are spinning.

Figure 9:
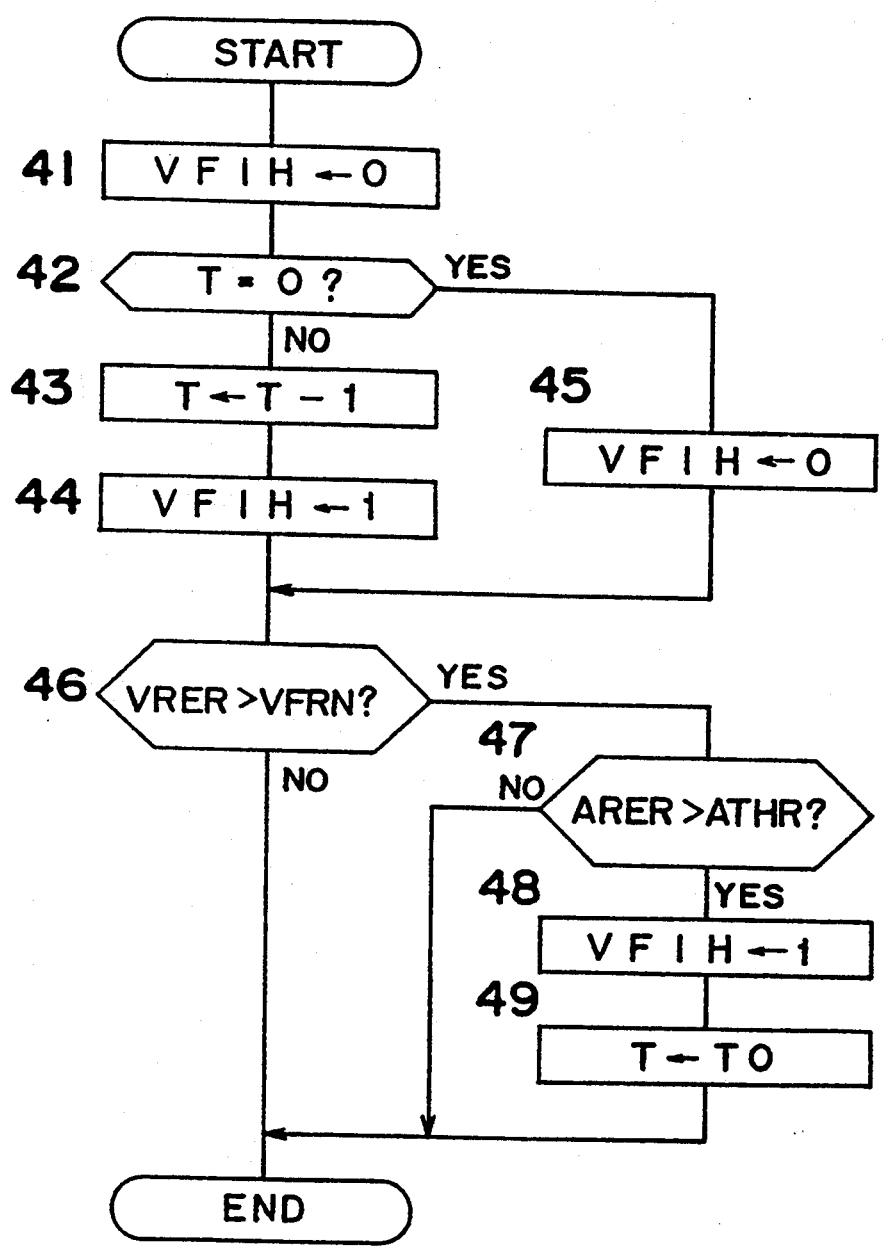
FIG. 9 is a detailed flow chart of the wheel spinning detection subroutine in the calculation unit of the antilock brake control system comprising an estimated vehicle speed calculation apparatus according to the present invention.

The wheel spin calculation subroutine S2-2 is shown in detail in FIG. 9.

The first step (#41) is to clear the driven wheel use prohibit flag VFIH (VFIH=0). The driven wheel use prohibit flag VFIH indicates whether the driven wheel speed can be used to calculate the estimated vehicle speed. If the flag is set (VFIH=1), the driven wheel speed cannot be used to calculate the estimated vehicle speed, and if the flag is not set (VFIH=0) the driven wheel speed can be used.

The timer T is then read (step #42) to see if T=0. This timer T is a countdown timer that counts down a predetermined period starting from when the acceleration of the driven wheels exceeds a predetermined acceleration level. When the value of the timer T is T=0, that is when the acceleration of the driven wheels does not exceed the predetermined acceleration level, the driven wheel use prohibit flag VFIH is therefore cleared (step #45) to 0 to enable the driven wheel speed to be used for estimated vehicle speed calculation. However, when T≠0, that is when the acceleration of the driven wheels exceeds the predetermined acceleration level and the timer T is counting the predetermined period, the procedure advances to the next step (#43) to decrement the timer one count, and then set (=1) the driven wheel use prohibit flag VFIH (step #44). The non-driven wheel speed VFRN and driven wheel speed VRER are then compared (step #46), and if the driven wheel speed VRER is higher, the procedure advances to step #47 to determine if the driven wheel acceleration ARER is greater than a predetermined threshold acceleration ATHR. If the driven wheel acceleration ARER is less than the threshold acceleration ATHR, the subroutine SR2-2 ends. If the driven wheel acceleration ARER is equal to or greater than the threshold acceleration ATHR, the driven wheel use prohibit flag VFIH is set (VFIH=1, step #48), and the timer T is set to the predetermined time T0 (step #49).

Thus, the wheel spin calculation subroutine SR2-2 sets the driven wheel use prohibit flag VFIH (VFIH=1) to prohibit calculation of the estimated vehicle speed based on the driven wheel speed VRER when the driven wheel speed VRER is higher than the non-driven wheel speed VFRN and the driven wheel acceleration ARER exceeds the threshold acceleration ATHR.

Returning to FIG. 7, from the wheel spin calculation subroutine SR2-2, the next step (#22) is to determine whether the brake edge flag BEG was set (=1) by the brake operation signal obtaining subroutine S1. If it was, the procedure advances to step #25. If the brake edge flag BEG was cleared (BEG=0), it is determined if the antilock brake control edge flag ALEG, which is set by the procedure shown in the FIG. 10 flow chart, is set (=1). If it was, the procedure advances to step #25. If it was not set, the procedure advances to the next step (#26).

By the two queries of steps #22 and #23 it is determined whether the brakes were just applied or if antilock brake control was just started. If either condition is true the procedure advances to step #25, but if both conditions are false (the brakes were not just applied and antilock brake control was not just started) the procedure advances to step #26.

At step #26 the sum of the estimated vehicle speed VREF obtained during the previous cycle plus a first predetermined speed ΔV1 is compared with the speed stored in memory VMEM, which is described later. If the speed stored in memory VMEM is higher, the value stored in memory VMEM is updated to the sum of the estimated vehicle speed VREF obtained during the previous cycle plus a first predetermined speed ΔV1 (step #27), but if the stored speed is less, the procedure advances to step #28.

It is to be noted that the first predetermined speed ΔV1 may be a value between 10–20 km/hr.

If either flag BEG or ALEG is set, the value stored in memory VMEM is updated to the sum of the estimated vehicle speed VREF obtained in the previous cycle plus a second predetermined speed ΔV2 where the value of the second predetermined speed ΔV2 is up to several percent of the estimated vehicle speed VREF or a value between 0–3 km/hr.

Figure 10:
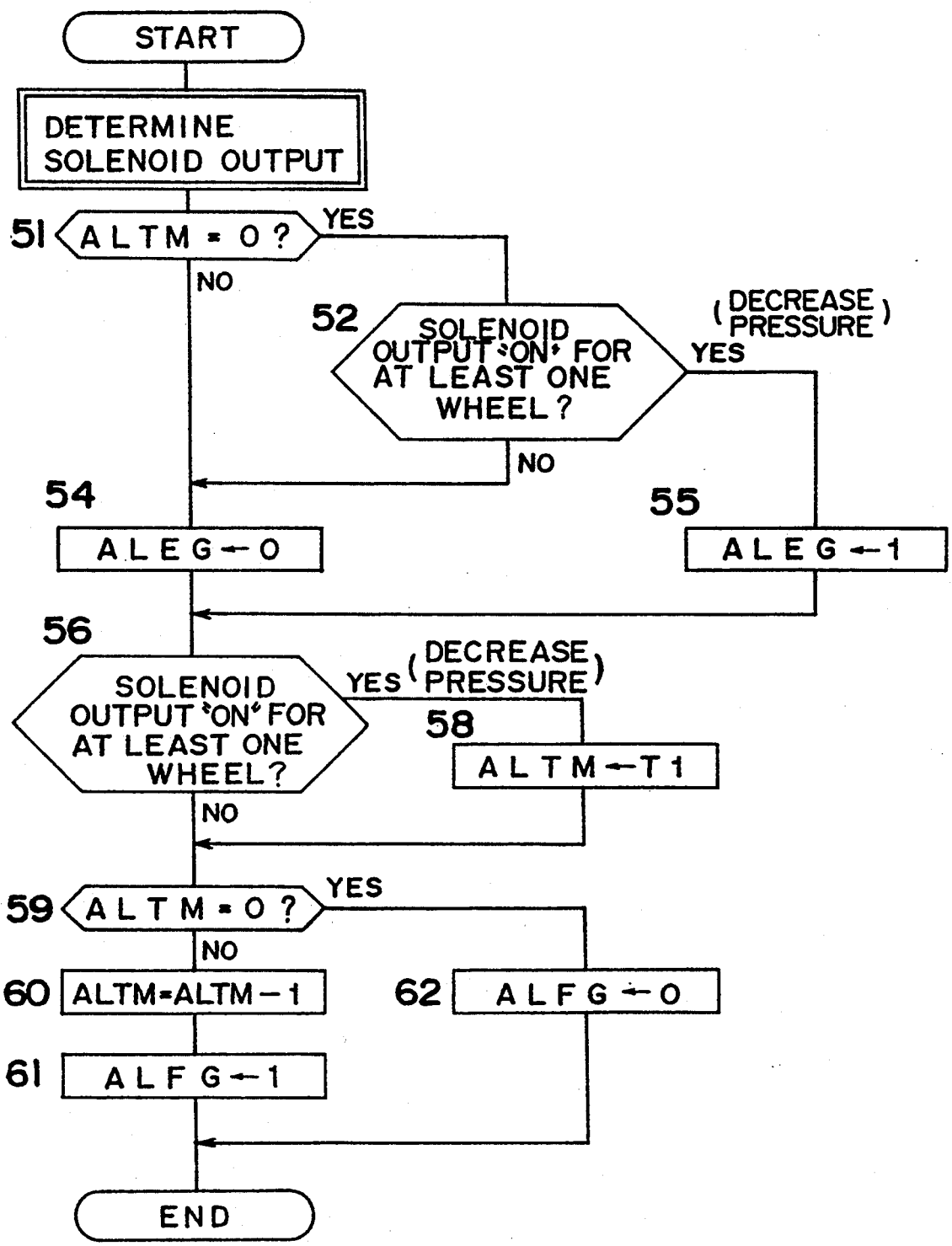
FIG. 10 is a detailed flow chart of the control algorithm subroutine in the calculation unit of the antilock brake control system comprising an estimated vehicle speed calculation apparatus according to the present invention.

After the speed stored in memory VMEM is updated, it is determined whether the antilock brake control flag ALFG, described below with reference to FIG. 10, is set. If ALFG is set, the procedure advances to step #31, and if it is not set, the procedure checks the brake flag BRK to see if it is set (step #29). If the brake flag BRK is set the procedure advances to step #31, and if it is not set the procedure advances to step #35.

Thus, by checking the antilock brake control flag ALFG and the brake flag BRK it is determined if antilock brake control is being applied to any wheel or if the brakes are applied. If either of these conditions is true, the procedure goes to step #31. If both conditions are false, the speed stored in memory VMEM is cleared to 0 (step #35) and then set to the estimated vehicle speed VREF obtained in the previous cycle (step #36).

If either ALFG or BRK is set, three conditions are tested to set the value of register VHI in either step #34 or #37. In the first test the non-driven wheel speed VFRN is compared with driven wheel speed VRER (step #31), and if the non-driven wheel speed VFRN is higher the procedure skips to step #37. If not, the driven wheel speed VRER is compared with the speed stored in memory VMEM (step #32), and if the driven wheel speed VRER is higher the procedure skips to step #37. If the speed stored in memory VMEM is higher, it is determined if the driven wheel use prohibit flag VFIH is set (VFIH=1). If VFIH is set, the procedure skips to step #37, but if it is not set the procedure advances to step #34. Thus, the register VHI is set to either the driven wheel speed VRER (step #34) or the non-driven wheel speed VFRN (step #37).

With these tests the non-driven wheel speed VFRN and driven wheel speed VRER are compared (step #31) and the non-driven wheel speed VFRN is stored to the register VHI if VFRN is greater than the driven wheel speed VRER. If the driven wheel speed VRER is higher, however, the driven wheel speed VRER is stored to the register VHI only if the other two tests are also cleared (steps #32 and #33). Therefore, even if the driven wheel speed VRER is higher than the non-driven wheel speed VFRN, the non-driven wheel speed VFRN will still be stored to the register VHI if the driven wheel speed VRER is higher than the speed stored in memory VMEM (step #32), or if the driven wheel use prohibit flag VFIH is set (=1, step #33).

After the register VHI is set, the stored estimated vehicle speed VREF is updated to the speed stored in the register VHI (step #38).

It is to be noted that the step (#39) shown with a dotted line can be substituted for step #38 to apply a filter to calculate an estimated vehicle speed VREF that is even closer to the actual vehicle speed. This filter is based on the speed stored in the register VHI and the estimated vehicle speed VREF obtained in the previous cycle, and can be expressed by the following equation.

$$VREF = \{(n-1)/n\}VREF + (1/n)VHI$$

It is to be noted that VREF is obtained based on the stored value VHI in this equation, but the intended effect of the invention can also be obtained by applying other equation.

FIG. 10 is a flow chart of the control algorithm subroutine SR3. The first step in the control algorithm subroutine is another subroutine whereby the solenoid output controlling the reduction of the hydraulic brake pressure is determined by a separate antilock brake control system not shown in the figures. More specifically, when the brakes are applied and symptoms indicating brake locking are detected, the antilock brake control system applies an output to the hydraulic brake pressure control solenoid to reduce the brake pressure and thereby release wheel locking. Antilock brake control starts with the generation of this output to the solenoid, and continues for a predetermined period T1 after solenoid output ends.

The timer ALTM counting the predetermined period T1 is then checked (step #51) to determine whether the period has elapsed (ALTM=0). If ALTM=0, it is determined if the solenoid output for any one of the wheels is still being generated, thus reducing the brake pressure of the corresponding wheel (step #52). If antilock brake control is thus determined to be in effect for any wheel, the antilock brake control edge flag ALEG is set (=1, step #55), otherwise the antilock brake control edge flag ALEG is cleared to 0 (step #54).

It is then determined again (step #54) if the solenoid output for any one of the wheels is being generated. If antilock brake control is thus determined to be in effect for any wheel, the timer ALTM is set to the predetermined period T1 (step #58). If it is detected that no solenoid output is produced (step #56), the timer ALTM is checked to determine if period T1 has elapsed (T1=0, step #59). If the period T1 is over, the antilock brake control flag ALFG indicating that antilock brake control is being applied to some wheel is cleared (=0) to indicate that antilock brake control is not being applied. If the timer ALTM is not equal to 0, the timer ALTM is decremented (step #60), and the antilock brake control flag ALFG is set (=1) to indicate that antilock brake control is being applied.

Figure 11:
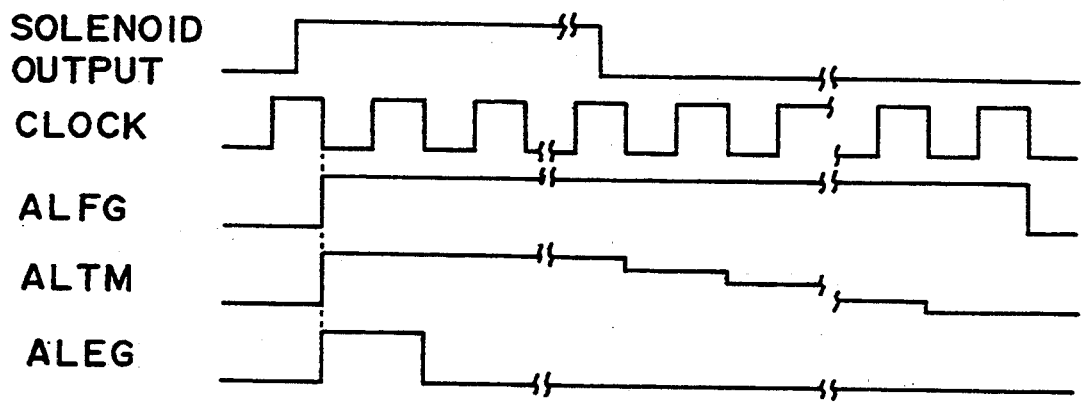
FIG. 11 is a timing chart of the control algorithm subroutine shown in FIG. 10.

The procedure controlled by the flow chart in FIG. 10 is described more specifically below with reference to the timing chart in FIG. 11.

When there is no output from the non-driven wheel solenoids, i.e., antilock brake control is not in effect, steps #51, #52, #54, #56, #59, and #62 are executed, thus clearing the antilock brake control flag ALFG and antilock brake control edge flag ALEG to 0 and holding the timer ALTM to 0. Once antilock brake control starts, however, the solenoid output changes from 0 to 1. In the first following subroutine cycle (at the clock signal drop), the procedure goes from step #52 to step #55 to set the antilock brake control edge flag ALEG (=1), and from step #56 to step #58 to start the timer ALTM counting the predetermined period T1. Because the timer ALTM has now been started, a NO is returned by the step #59 query, causing the timer ALTM to be decremented (step #60) and the antilock brake control flag ALFG to be set (step #61).

In the next loop through the procedure a NO is returned by the timer ALTM query (step #51), causing the antilock brake control edge flag ALEG to be cleared (=0). Because antilock brake control is still continuing (step #56), the timer ALTM is reset to predetermined period T1 (step #58), again causing the procedure flow to pass through steps #59–#61, decrementing the timer ALTM and holding the antilock brake control flag ALFG set (=1). These same steps #51, #54, #56, #58, #59, #60, and #61 are repeated thereafter for as long as at least one solenoid continues to function to reduce the brake pressure.

Once the solenoid output changes from 1 to 0 as antilock brake control ends, the next cycle through the control algorithm subroutine S3 again flows from step #51 to step #54 because the timer ALTM is not cleared, thus keeping the antilock brake control edge flag ALEG cleared (=0). Solenoid output checking (step #56), however, prevents the timer ALTM from being reset (step #58). The timer ALTM is therefore decremented (step #60), and the antilock brake control flag ALFG is held set (=1) until the timer ALTM is cleared. In Other words, the antilock brake control flag ALFG remains set until the timer ALTM counts the predetermined period T1 down to 0.

The operation of an estimated vehicle speed calculation apparatus according to the present invention is described below with reference to the graph shown in FIG. 12.

It is assumed that at first the brakes are not applied and antilock brake control is not in effect. Each of the flags BEG, ALEG, ALFG, BRK, and VFIH is therefore cleared to 0.

Figure 12:
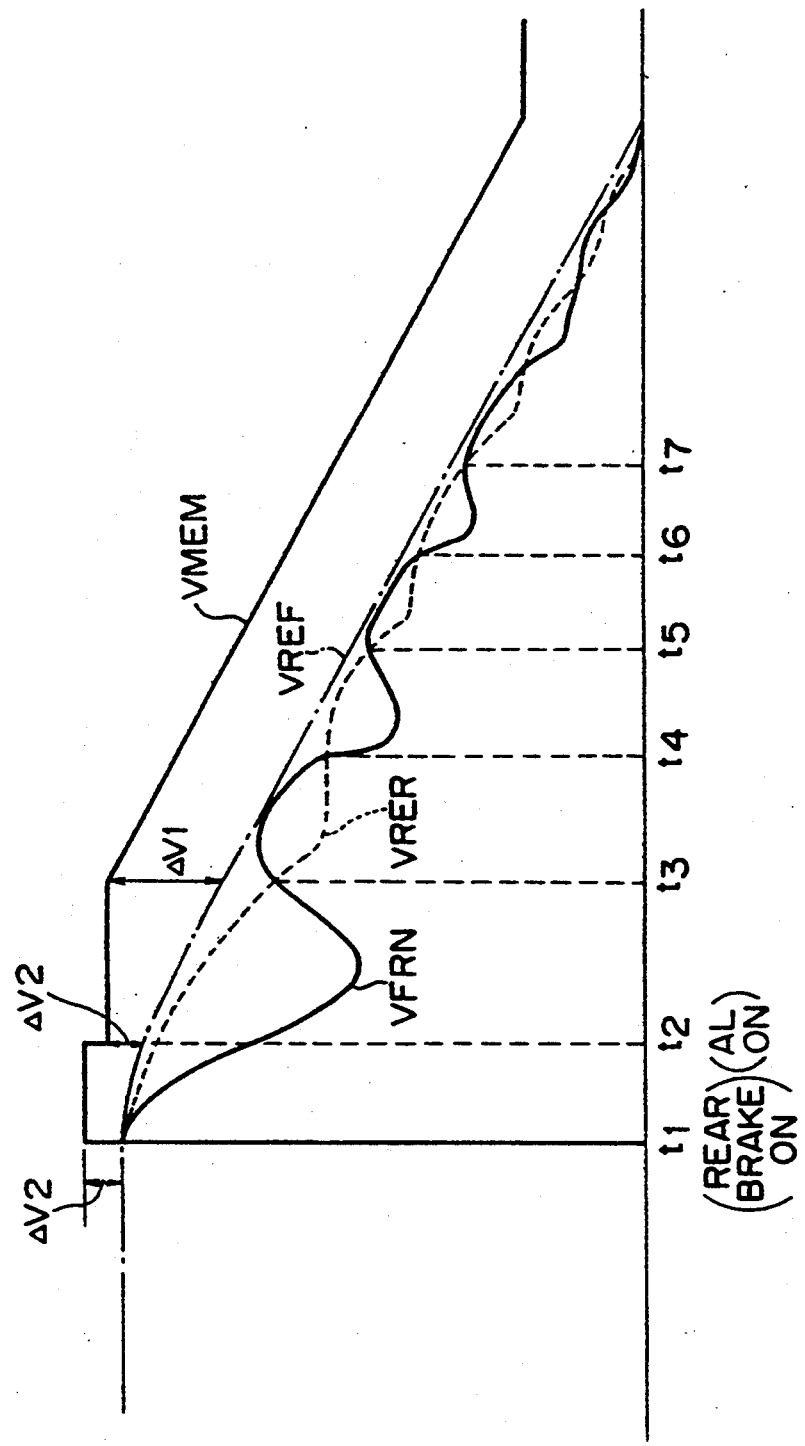
FIG. 12 is a graph used to describe the procedure for calculating the estimated vehicle speed according to the invention.

The brakes are then applied at time t1 in FIG. 12. As a result, the brake flag BRK is set to 1 and the brake edge flag BEG is set to 1 as a high pulse by the brake operation signal obtaining subroutine S1 shown in FIG. 5. The first test in the estimated vehicle speed calculation subroutine SR2 shown in FIG. 7 therefore returns a YES (step #22), causing the sum of the estimated vehicle speed VREF obtained in the previous cycle plus the second predetermined speed ΔV2 to be stored in memory VMEM.

It is next assumed that antilock brake control is started at time t2 in FIG. 12. The antilock brake control edge flag ALEG and the antilock brake control flag ALFG are therefore set at steps #55 and #60 in the control algorithm subroutine S3 (FIG. 10). The second test (step #23) in subroutine S2 therefore returns YES (ALEG=1), and the value stored in the memory VMEM is updated with the sum of the estimated vehicle speed VREF obtained in the previous cycle plus the second predetermined speed ΔV2. Because either antilock brake control is still in effect or the brakes are still applied from time t1 to time t3, one of the tests for the corresponding flags ALFG and BRK (steps #28 and #29) returns a YES, causing subroutine SR2 to go to the test in step #31. The non-driven wheel speed VFRN and driven wheel speed VRER are therefore compared.

In the example shown in FIG. 12, the driven wheel speed VRER is higher, the driven wheel speed VRER is lower than the estimated vehicle speed stored in memory VMEM at this time (step #32), and the driven wheel use prohibit flag VFIH is cleared (=0, step #33). The driven wheel speed VRER is therefore stored to the register VHI (step #34), and the register VHI value, i.e., the driven wheel speed VRER, is set as the estimated vehicle speed VREF (step #38), or the filtered register VHI value based on the driven wheel speed VRER is set as the estimated vehicle speed VREF (step #39).

At some point near time t3 both the brake edge flag BEG and the antilock brake control edge flag ALEG are reset, and the estimated vehicle speed calculation subroutine S2 (FIG. 7) therefore passes through test steps #22 and #23 to step #26 to compare the estimated vehicle speed stored in memory VMEM with the sum of the estimated vehicle speed VREF from the previous cycle plus a first predetermined speed ΔV1. If the estimated vehicle speed stored in memory VMEM is greater, i.e., if the difference between the stored estimated vehicle speed and the estimated vehicle speed VREF updated each cycle is greater than a first predetermined speed ΔV1, the estimated vehicle speed stored in memory VMEM is updated to the sum of the estimated vehicle speed VREF updated each cycle plus a first predetermined speed ΔV1 (step #27). If the estimated vehicle speed VREF continues to drop, the estimated vehicle speed stored to the memory VMEM each cycle is also updated each cycle.

From time t3 to t4 the non-driven wheel speed VFRN is greater than the driven wheel speed VRER, thus causing the register VHI to be immediately updated to the non-driven wheel speed VFRN (step #37), and the estimated vehicle speed VREF to be updated to the non-driven wheel speed VFRN or to the filtered register VHI value to obtain an estimated vehicle speed that is even closer to the actual vehicle speed (step #39).

While not shown in the graph in FIG. 12, if the driven wheel speed VRER, indicated by the dotted line, exceeds the estimated vehicle speed VREF, indicated by the dot-dash line, the procedure flows through steps #31, #32, and #37 in FIG. 7, and the non-driven wheel speed VFRN is still used to calculate the estimated vehicle speed VREF.

While also not shown in FIG. 12, even if the driven wheel speed VRER, indicated by the dotted line, exceeds the non-driven wheel speed VFRN, indicated by the solid line wave, and is less than the estimated vehicle speed VREF, if the acceleration is greater than the threshold acceleration ATHR, the driven wheel use prohibit flag VFIH will be set (=1, step #48 in FIG. 9). The driven wheel use prohibit flag VFIH test in step #33, FIG. 7, therefore prevents the driven wheel speed VRER from being assigned to the register VHI, and the non-driven wheel speed VFRN is again used (step #37) to obtain the estimated vehicle speed VREF (step #38 or #39).

Figure 13:
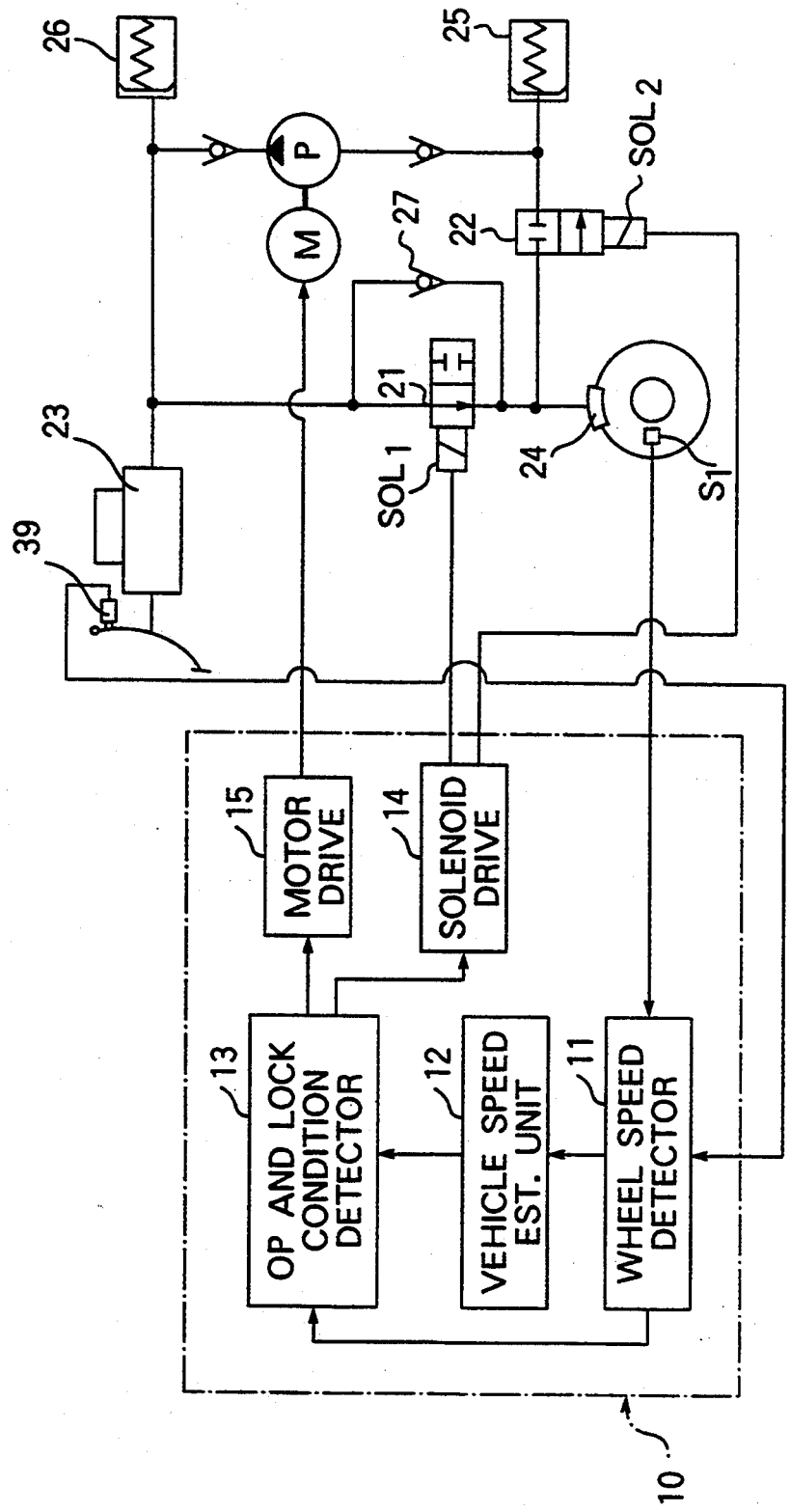
FIG. 13 is a block diagram of an antilock brake control system comprising a hardware version of the estimated vehicle speed calculation apparatus according to the present invention.

It is to be noted that the above embodiments of the invention have been described as software implementations, and a hardware embodiment of the invention is described next. FIG. 13 is a block diagram of an antilock brake control system comprising a hardware version of the estimated vehicle speed detection apparatus according to the present invention. The control unit 10 takes the inputs from the wheel speed sensors S1–S4 (only S1 is shown in the figure for simplicity), performs the various calculations and determinations of the invention, and outputs the control signal to the pressure reduction circuit.

The pulse obtained from the wheel speed sensor S1 is counted by the wheel speed detector 11, and the count is input to the vehicle speed estimation unit 12 as the wheel speed signal. Any locking tendency of the wheels is detected by the operation and lock condition detector 13, which determines whether the deceleration is less than a predetermined value or the slip speed (the difference between the estimated vehicle speed and wheel speed) is greater than a predetermined value based on the calculated deceleration or estimated vehicle speed. If wheel locking symptoms are detected, a pressure reduction command is output to the solenoid drive circuit 14. The solenoid drive circuit 14 thus excites the solenoid SOL1, and the pressure control valve 21 moves to the left in FIG. 13, cutting off the pressure reduction circuit from the master cylinder 23 to the wheel cylinder 24. If solenoid SOL2 is also excited, the pressure control valve 22 moves up in FIG. 13, opening the line between the wheel cylinder 24 and the reservoir 25. The motor M is also started by the motor drive circuit 15, and brake fluid forced out from the reservoir 25 is returned to the accumulator 26 and master cylinder 23 by the pump P, thus reducing the brake pressure.

The danger of wheel locking is considered to have been avoided when the wheel speed returns to normal and the deceleration or slip speed exceeds a predetermined value. The operation and lock condition detector 13 therefore outputs a pressurize command to the solenoid drive circuit 14. The solenoid drive circuit 14 thus shuts off the solenoids SOL1 and SOL2, and pressure control valves 21 and 22 return to the state shown in FIG. 13. The pressure reduction circuit between the fluid pressure generating means and the wheel cylinder 24 is therefore opened, and brake pressure again rises.

It is to be noted that if the pressure reduction command or pressurize command is canceled after it is output and the pressure hold command is output, the brake pressure can be maintained by exciting the first pressure control valve 21 solenoid SOL1 and shutting off the other pressure control valve 22 solenoid SOL2. The first pressure control valve 21 thus moves to the left in the figure to cut off the fluid pressure circuit, but the pressure control valve 22 remains in the position shown in FIG. 13 so that the fluid pressure already in the wheel cylinder 24 remains constant. Note that there is a bypass valve 27 bypassing the first pressure control valve 21 line.

The vehicle speed estimation unit 12 is described in more detail below with reference to FIG. 14.

Figure 14:
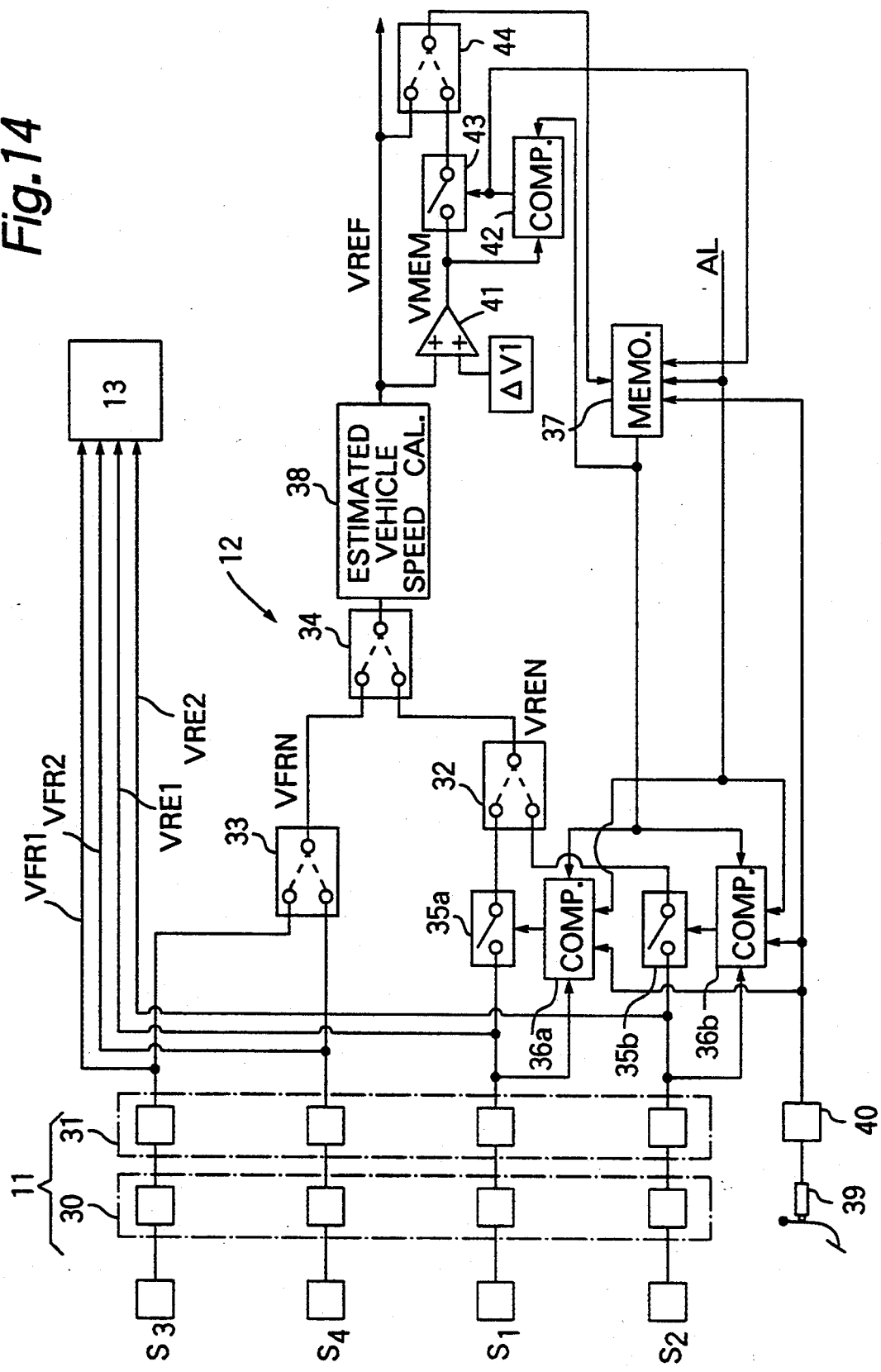
FIG. 14 is a block diagram of the vehicle speed estimating means shown in FIG. 13.

As shown in FIG. 14, the signals from the wheel speed sensors S1 and S2 for the driven wheels and S3 and S4 for the non-driven wheels are input to the interface circuit 30 and converted to pulses. The pulses are then counted and the wheel speeds calculated by the corresponding wheel speed operation circuits 31, generating the digitized wheel speed signals VFR1, VFR2, VFR3, and VFR4 that are supplied to the operation and lock condition detector 13 and the vehicle speed estimation unit 12.

In other words, the interface circuit 30 and wheel speed operation circuit 31 correspond to the wheel speed detector 11.

The wheel speed signals VFR1 and VFR2 for the non-driven wheels are compared by the comparator 33, and the larger of the two values is selected and input to the next comparator 34 as the non-driven wheel speed VFRN. The wheel speed signals VRE1 and VRE2 for the driven wheels are respectively input to the switches 35a and 35b and comparators 36a and 36b. The comparators 36a and 36b compare wheel speed signals VRE1 and VRE2 with the stored estimated vehicle speed VREF immediately after the brakes are applied or antilock brake control begins. If the wheel speed VRE1 or VRE2 is less than the estimated vehicle speed VREF, a trigger signal is output and the corresponding switch 35a or 35b is closed. The wheel speed signals VRE1 and VRE2 output from the switches 35a and 35b are thus conditionally input to the comparator 32, and the higher value is selected and input to the driven and non-driven wheel speed comparator 34 as the driven wheel speed VRER.

The comparator 34 thus compares the non-driven wheel speed VFRN with the driven wheel speed VRER, selects the higher value, and inputs the result to the estimated vehicle speed calculation circuit 38.

The estimated vehicle speed VREF output from the estimated vehicle speed calculation circuit 38 is input directly to the operation and lock condition detector 13 downstream from the vehicle speed estimation unit 12 in the control unit 10, and to the adder 41 and comparator 44. The adder 41 adds the estimated vehicle speed VREF and the first predetermined speed $\Delta V1$, and the resulting sum and the stored estimated vehicle speed VREF are compared by the comparator 42.

The sum output (VREF+$\Delta V1$) from adder 41 will at some point become less than the stored estimated vehicle speed VREF because the estimated vehicle speed VREF output from the estimated vehicle speed calculation circuit 38 decreases with time. When it does, the comparator 42 outputs a trigger signal. This trigger signal causes the switch 43 to close, thereby updating the contents of the memory circuit 37. Thus, the comparator 44 compares the signal (VREF+$\Delta V1$) output from the switch 43 with the new estimated vehicle speed VREF output from the estimated vehicle speed calculation circuit 38, selects the higher value (VREF+$\Delta V1$), and outputs the result to the memory circuit 37. The value stored in the memory circuit 37 is thus updated by the signal input from the comparator 44 according to the trigger signal output by comparator 42.

The memory circuit 37 is activated either by the antilock brake control edge flag ALEG set when antilock brake control starts, the brake edge flag BEG set when the brakes are first pressed, or the trigger signal output from comparator 42, and stores the estimated vehicle speed output from comparator 44 to update the memory circuit 37 contents.

If antilock brake control is not in effect at this time, the antilock signal AL is not generated, comparators 36a, 36b, and memory circuit 37 do not operate, and switches 35a and 35b are open. As a result, there is no input to, and therefore no output from, the driven wheel speed comparator 32. The higher non-driven wheel speed VFR1 or VFR2 selected and output by comparator 33 as the non-driven wheel speed VFRN is therefore the only input to comparator 34, and the output from comparator 33, i.e., the non-driven wheel speed VFRN, is input to the estimated vehicle speed calculation circuit 38.

The antilock signal AL is generated when antilock brake control begins, causing comparators 36a and 36b to operate, and memory circuit 37 to store the current estimated vehicle speed.

This stored speed is thus compared with the wheel speeds VRE1 and VRE2 of the driven wheels by the comparators 36a and 36b, respectively. If the wheel speed VRE1 or VRE2 is less than the stored speed, the corresponding switch 35a or 35b closes. The switch outputs to the comparator 32 are thus compared, and the higher wheel speed VRE1 or VRE2 is output from the comparator 32 as the driven wheel speed VRER to the driven and non-driven wheel speed comparator 34.

This comparator 34 thus compares the selected non-driven VFRN and driven VRER wheel speeds, selects and outputs the higher value to the estimated vehicle speed calculation circuit 38.

The estimated vehicle speed calculation circuit 38 sets the estimated vehicle speed VREF based, for example, on the assignment (step #38) or filter calculation (step #39) shown in FIG. 7, outputs the result to the downstream operation and lock condition detector 13, and to the comparator 42 and comparator 44. As a result, a trigger signal is output from the comparator 42 when the sum of the new estimated vehicle speed VREF plus the first predetermined speed $\Delta V1$ becomes less than the stored estimated vehicle speed VREF, and this trigger signal causes the value stored in the memory circuit 37 to be updated based on the sum of the new estimated vehicle speed VREF plus the first predetermined speed $\Delta V1$.

As described hereinabove, an estimated vehicle speed calculation apparatus according to the present invention can calculate an estimated vehicle speed that is closer to the actual vehicle speed because the estimated vehicle speed is calculated using the highest vehicle speed calculated from the wheel speeds of the non-driven and driven wheels where the higher driven wheel speed is also less than the previously calculated estimated vehicle speed for as long as the brakes are applied or antilock brake control is considered to be in effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An estimated vehicle speed calculating apparatus for calculating an estimated vehicle speed based upon a wheel speed of a driven wheel and a non-driven wheel of a vehicle equipped with an antilock brake control for each wheel, comprising:
a sensing device that detects said wheel speed of said driven wheel and said non-driven wheel of said vehicle;
a calculating device that calculates an estimated vehicle speed based on an input data;
a storage device that stores said estimated vehicle speed calculated by said calculating device at a time when said antilock brake control is applied with respect to at least one of said driven wheel and said non-driven wheel or a brake operation begins;
a detecting device that detects a period when said antilock brake control is applied;
a second detecting device the detects a period when the brakes of said vehicle are applied;
first means for comparing a highest non-driven wheel speed with a highest driven wheel speed;
second means for comparing said highest driven wheel speed with said stored estimated vehicle speed;
third means for comparing said stored estimated vehicle speed with a sum of a newly obtained estimated vehicle speed plus a first predetermined value, said first predetermined value being within a range of ten to twenty kilometers per hour;
means for renewing said stored estimated vehicle speed to equal a sum of said newly obtained estimated vehicle speed plus said first predetermined value when said stored estimated vehicle speed becomes greater than said sum of said newly obtained estimated vehicle speed plus said first predetermined value;
first means for selecting, as said input data, said highest non-driven wheel speed when said highest non-driven wheel speed is greater than said highest driven wheel speed, or when said highest driven wheel speed is greater than said stored estimated vehicle speed; and
second means for selecting, as said input data, said highest driven wheel speed when said highest non-driven wheel speed is not greater than said highest driven wheel speed and said highest driven wheel speed is not greater than said stored estimated vehicle speed.

2. An estimated vehicle speed calculating apparatus according to claim 1, wherein said first calculating device uses an actual wheel speed as the said estimated vehicle speed.

3. An estimated vehicle speed calculating apparatus according to claim 1, wherein said calculating devices applies a filter to said wheel speed, said filtered wheel speed being used as said estimated vehicle speed.

4. An estimated vehicle speed calculating apparatus according to claim 1, wherein said storage device stores a sum of said estimated vehicle speed plus a second predetermined value.

5. An estimated vehicle speed calculating apparatus according to claim 4, wherein said second predetermined value comprises a value equal to several kilometers per hour.

6. An estimated vehicle speed calculating apparatus according to claim 4, wherein said second predetermined value comprises a value equal to a predetermined percentage of said estimated vehicle speed.

7. An estimated vehicle speed calculating apparatus according to claim 1, further comprising means for resetting said stored estimated vehicle speed in said storage device when said antilock brake control is not applied to at least one of said non-driven wheel or said driven wheel and the brakes of said vehicle are not applied.

8. An estimated vehicle speed calculating apparatus according to claim 1, further comprising means for calculating said estimated vehicle speed based upon said non-driven wheel speed when said antilock brake control is not applied to at least one of said non-driven wheel and said driven wheel and the brakes of said vehicle are not applied.

9. An estimated vehicle speed calculating apparatus according to claim 8, further comprising:
a counter that counts a predetermined period after said wheel speed of said driven wheel is determined to be greater than said wheel speed of said non-driven wheel and an acceleration of said driven wheel is greater than a predetermined acceleration, and
means for prohibiting said calculation of said estimated vehicle speed while said counter counts said predetermined period.

10. An estimated vehicle speed calculating apparatus according to claim 1, further comprising means for prohibiting said calculation of said estimated vehicle speed when said wheel speed of said driven wheel is greater than said wheel speed of said non-driven wheel and an acceleration of said driven wheel is greater than a predetermined acceleration.

11. An apparatus for calculating an estimated speed of a vehicle equipped with an antilock brake control, said estimated vehicle speed being based upon a wheel speed of at least one driven wheel and non-driven wheel of the vehicle, comprising:
a sensor that senses a wheel speed of said driven wheel and said non-driven wheel;
a calculation unit that calculates an estimated vehicle speed based on inputted data;
a memory that stores said calculated estimated vehicle speed when said antilock brake control operates with respect to at least one of said driven wheel and non-driven wheel, or a brake of said vehicle is operated;
a first detector that detects a period when said antilock brake control operates;
a second detector that detects a period when said brake is operated;
a first comparator that compares a highest non-driven wheel speed with a highest driven wheel speed;
a second comparator that compares said highest driven wheel speed with said stored estimated vehicle speed;
a first selector that selects, as said input data, said highest non-driven wheel speed when said highest non-driven wheel speed is greater than said highest driven wheel speed, or when said highest driven wheel speed is greater than said stored estimated vehicle speed;

a second selector that selects, as said input data, said highest driven wheel speed when said highest non-driven wheel speed is not greater than said highest driven wheel speed and said highest driven wheel speed is not greater than said stored estimated vehicle speed; and a prohibitor that prohibits said calculation of said estimated vehicle speed when said wheel speed of said driven wheel is greater than said wheel speed of said non-driven wheel and an acceleration of said driven wheel exceeds a predetermined acceleration.

12. The apparatus of claim 11, wherein said memory stores a value equal to a sum of said estimated vehicle speed and a predetermined value.

13. The apparatus of claim 12, wherein said predetermined value comprises a value equal to a predetermined speed.

14. The apparatus of claim 12, wherein said predetermined value comprises a value equal to a predetermined percentage of said estimated vehicle speed.

15. The apparatus of claim 11, further comprising:

a second calculator that calculates said estimated vehicle speed based upon said non-driven wheel speed when said antilock brake control is not applied and said brake is not operated; and a counter that counts a predetermined period after said wheel speed of said driven wheel is determined to be greater than said wheel speed of said non-driven wheel and said acceleration of said driven wheel exceeds said predetermined acceleration, said prohibitor prohibiting said calculation of said estimated vehicle speed while said counter counts said predetermined period.

16. An apparatus for calculating an estimated speed of a vehicle equipped with an antilock brake control, said estimated vehicle speed being based upon a wheel speed of at least one driven wheel and non-driven wheel of the vehicle, comprising:

a first sensor that senses a wheel speed of said driven wheel;

a second sensor that senses a wheel speed of said non-driven wheel;

an interface unit that receives signals from said first sensor and said second sensor and outputs signals dependent upon a rotational velocity of said driven wheel and said non-driven wheel and an operational condition of a brake associated with the vehicle;

a calculation unit that receives said signals from said interface unit to calculate an estimated vehicle speed and to perform calculations required for operating said antilock brake control of said driven wheel and said non-driven wheel, said antilock brake control calculations being based upon a modified estimated vehicle speed that is determined by adding a predetermined value to said estimated vehicle speed;

a drive circuit that receives results of said antilock brake control calculations performed by said calculation unit, said drive unit generating an output drive signal;

a first actuator associated with said driven wheel; and a second actuator associated with said non-driven wheel, said output drive signal controlling said first actuator and said second actuator to enable a separate antilock brake control of each wheel, said calculation unit being prohibited from calculating said estimated vehicle speed when said wheel speed of said driven wheel is greater than said wheel speed of said non-driven wheel and an acceleration of said driven wheel exceeds a predetermined acceleration.

17. The apparatus of claim 16, wherein said predetermined value comprises a value equal to a predetermined speed.

18. The apparatus of claim 17, wherein said predetermined speed is between ten and twenty kilometers per hour.

19. The apparatus of claim 16, wherein said predetermined value comprises a value equal to a predetermined percentage of said estimated vehicle speed.

* * * * *

UNITED STATES PATENT AND TRADEMARK OFFICE
CERTIFICATE OF CORRECTION

PATENT NO. : 5,414,628
DATED : May 9, 1995
INVENTOR(S) : M. YOSHINO

It is certified that error appears in the above-indentified patent and that said Letters Patent is hereby corrected as shown below:

On the title page, in section [56], "References Cited", "U.S. PATENT DOCUMENTS", column 1, line 7, change "5,219,693" to ---5,210,693---.

At column 1, line 31, change "vehicle,speed" to ---vehicle speed---.

At column 1, line 53, change "storing," to ---storing---.

At column 7, line 44, change "equation." to ---equations.---.

At column 8, line 58, change "Other" to ---other---.

Signed and Sealed this

Twenty-sixth Day of November 1996

Attest:

BRUCE LEHMAN

*Attesting Officer*  *Commissioner of Patents and Trademarks*